(12) United States Patent
Dempsey

(10) Patent No.: US 11,005,676 B2
(45) Date of Patent: May 11, 2021

(54) DETACHABLE FACEPLATE WITH WIRELESS ENVIRONMENTAL SENSING DEVICES

(71) Applicant: Carrier Corporation, Palm Beach Gardens, FL (US)

(72) Inventor: Daniel J. Dempsey, Carmel, IN (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 150 days.

(21) Appl. No.: 16/085,702

(22) PCT Filed: Mar. 17, 2017

(86) PCT No.: PCT/US2017/022999
§ 371 (c)(1),
(2) Date: Sep. 17, 2018

(87) PCT Pub. No.: WO2017/161291
PCT Pub. Date: Sep. 21, 2017

(65) Prior Publication Data
US 2019/0097834 A1 Mar. 28, 2019

Related U.S. Application Data

(60) Provisional application No. 62/310,011, filed on Mar. 18, 2016.

(51) Int. Cl.
*H02G 3/14* (2006.01)
*H04L 12/28* (2006.01)
(Continued)

(52) U.S. Cl.
CPC ........ *H04L 12/2827* (2013.01); *G01D 11/245* (2013.01); *H02G 3/081* (2013.01);
(Continued)

(58) Field of Classification Search
CPC ............ H02G 3/14; H02G 3/081; H02G 3/08; G01D 11/24; G01D 11/245; H04L 12/28;
(Continued)

(56) References Cited

U.S. PATENT DOCUMENTS 5,221,814 A * 6/1993 Colbaugh ................ H02G 3/14
174/66
5,816,682 A 10/1998 Marischen
(Continued)

FOREIGN PATENT DOCUMENTS

WO 2015187491 A1 12/2015

OTHER PUBLICATIONS

Acuity Brands, "Sensor Switch", available at: https://www.acuitybrands.com/products/controls/sensor-switch, accesssed Sep. 14, 2018, 12 pages.
(Continued)

*Primary Examiner* — Angel R Estrada
(74) *Attorney, Agent, or Firm* — Cantor Colburn LLP

(57) ABSTRACT

A system includes a detachable faceplate. The detachable faceplate includes a casing including an interior surface and an exterior surface; and an environmental sensing device disposed within the casing. The environmental sensing device is configured to acquire data.

18 Claims, 2 Drawing Sheets

(51) Int. Cl.
*G01D 11/24* (2006.01)
*H02G 3/08* (2006.01)
*H04L 29/08* (2006.01)

(52) U.S. Cl.
CPC ........ *H04L 12/2823* (2013.01); *H04L 67/125* (2013.01); *H04L 2012/285* (2013.01); *H04L 2012/2841* (2013.01)

(58) Field of Classification Search
CPC ............. H04L 12/2827; H04L 12/2823; H04L 67/125; H04L 2012/2841; H04L 2012/285
USPC ................ 174/66, 67, 57, 58; 220/241, 242; 439/535, 536
See application file for complete search history.

(56) References Cited

U.S. PATENT DOCUMENTS

| | | | | |
|---|---|---|---|---|
| 7,734,038 | B2* | 6/2010 | Martich | H01R 13/6641 174/50 |
| 8,143,520 | B2* | 3/2012 | Cutler | H02G 3/14 174/66 |
| 8,668,347 | B2* | 3/2014 | Ebeling | H05B 47/10 174/66 |
| 9,755,374 | B2* | 9/2017 | St. Laurent | H01R 25/006 |
| 9,997,860 | B1* | 6/2018 | Hernandez, Jr. | H01R 13/447 |
| 10,364,977 | B2* | 7/2019 | O'Reilly | H02G 3/14 |
| 10,468,834 | B2* | 11/2019 | Diotte | H01R 13/447 |
| 2006/0000971 | A1 | 1/2006 | Jones et al. | |
| 2007/0178825 | A1 | 8/2007 | Aronstam et al. | |
| 2007/0227867 | A1 | 10/2007 | Yang | |
| 2009/0180274 | A1 | 7/2009 | Glazner et al. | |
| 2010/0130142 | A1 | 5/2010 | Schubert | |
| 2010/0244586 | A1 | 9/2010 | Roosli et al. | |
| 2013/0032594 | A1 | 2/2013 | Smith | |
| 2014/0285033 | A1 | 9/2014 | Jantunen et al. | |
| 2015/0195099 | A1 | 7/2015 | Imes et al. | |
| 2015/0256665 | A1 | 9/2015 | Pera et al. | |
| 2015/0276266 | A1 | 10/2015 | Warren et al. | |

OTHER PUBLICATIONS

DIY Network, "How to Install a Motion-Sensor Light Switch", available at: https://www.diynetwork.com/how-to/skills-and-know-how/electrical-and-wiring/how-to-install-a-motion-sensor-light-switch, accessed Sep. 14, 2018, 7 pages.

International Search Report and Written Opinion for application PCT/US2017/022999, dated Jun. 12, 2017, 8 pages.

Jenkins, Stephen, "Product Review: Lutron Maestro 600 3-Way Occupancy Sensor Switch", available at: https://www.stevejenkins.com/blog/2014/01/product-review-lutron-maestro-600-3-way-occupancy-sensor-switch/, accessed Sep. 14, 2018, 8 pages.

Lutron Electronics Co., Inc., "Rania® Wireless RF Switch and Radio Powr SavrTM Sensors", available at: http://www.lutron.com/TechnicalDocumentLibrary/367-1623_IN.pdf, accessed: Sep. 14, 2018, 4 pages.

Reuk, "Motion Sensor Light Switch", available at: http://www.reuk.co.uk/wordpress/lighting/motion-sensor-light-switch/, accessed Sep. 14, 2018, 7 pages.

* cited by examiner

DETACHABLE FACEPLATE WITH WIRELESS ENVIRONMENTAL SENSING DEVICES

CROSS REFERENCE TO RELATED APPLICATION

The present application is an international patent application, which claims priority to U.S. Patent Application Ser. No. 62/310,011, filed Mar. 18, 2016, the text and drawings of which are hereby incorporated by reference in its entirety.

TECHNICAL FIELD OF THE DISCLOSED EMBODIMENTS

The presently disclosed embodiments generally relate to HVA systems, and more particularly, to a detachable faceplate with wireless environmental sensing devices.

BACKGROUND OF THE DISCLOSED EMBODIMENTS

To increase efficiently increase comfort within a structure, wireless environmental sensors (e.g., temperature and humidity sensors) are used. In some instances, these sensors are mounted on a wall, and typically require adding holes to the wall. There is therefore a need for an improved device to wall mount wireless environmental sensors without increasing the number of devices visible on the wall, and adding holes to the wall.

SUMMARY OF THE DISCLOSED EMBODIMENTS

In one aspect, a system is provided. The system includes a detachable faceplate including a casing including an interior surface and an exterior surface, an aperture disposed through the casing, such that an electrical switching device may be disposed therein, an environmental sensing device disposed within the casing, the environmental sensing device configured to acquire environmental data, and a faceplate communication device disposed within the casing and operably coupled to the environmental sensing device, wherein the faceplate communication device is configured to transmit the environmental data. In an embodiment, the faceplate communication device is in wireless communication with the unit communication device. In an embodiment, the environmental data includes at least one of an ambient temperature and a relative humidity.

In an embodiment, the system further includes a unit in communication with the detachable faceplate. The unit includes a unit communication device in communication with the faceplate communication device, wherein the unit communication device is configured to transmit and/or receive the environmental data. In an embodiment, the unit further includes a unit controller operably coupled to the unit communication device, wherein the unit controller is configured to operate the unit based in part on the environmental data.

In an embodiment the detachable faceplate further includes a power source operably coupled to the environmental sensing device and the faceplate communication device. In an embodiment, the power source includes a battery. In another embodiment, the power source includes a power module.

In an embodiment, the environmental sensing device includes at least one of a temperature sensing device, a humidity sensing device, a proximity sensing device, a motion sensing device, a sound sensing device, and a light sensing device.

In one aspect, a detachable faceplate is provided. The detachable faceplate includes a casing including an interior surface and an exterior surface, an aperture disposed through the casing, such that an electrical switching device may be disposed therein, an environmental sensing device disposed within the casing, the environmental sensing device configured to acquire environmental data, and a faceplate communication device disposed within the casing and operably coupled to the environmental sensing device, wherein the faceplate communication device is configured to transmit the environmental data.

In an embodiment, the environmental sensing device includes at least one of a temperature sensing device, a humidity sensing device, a proximity sensing device, a motion sensing device, a sound sensing device, and a light sensing device. In an embodiment, the environmental data comprises at least one of an ambient temperature and a relative humidity. In an embodiment, the faceplate communication device is in wireless communication with the unit communication device.

In an embodiment, the detachable faceplate further includes a power source operably coupled to the environmental sensing device and the faceplate communication device. In an embodiment, the power source includes a battery. In another embodiment, the power source includes a power module.

In one aspect, a method of operating a system including a detachable faceplate operably coupled to a system component is provided. The detachable faceplate includes an environmental sensing device, and the method includes operating the detachable faceplate to acquire data, operating the detachable faceplate to transmit the data to the system component, operating the system component based in part on the data.

In an embodiment, the data includes environmental data. In an embodiment, the environmental data includes at least one of an ambient temperature, relative humidity, motion, light sensitivity, and audio.

DETAILED DESCRIPTION OF THE DISCLOSED EMBODIMENTS

Figure 1:
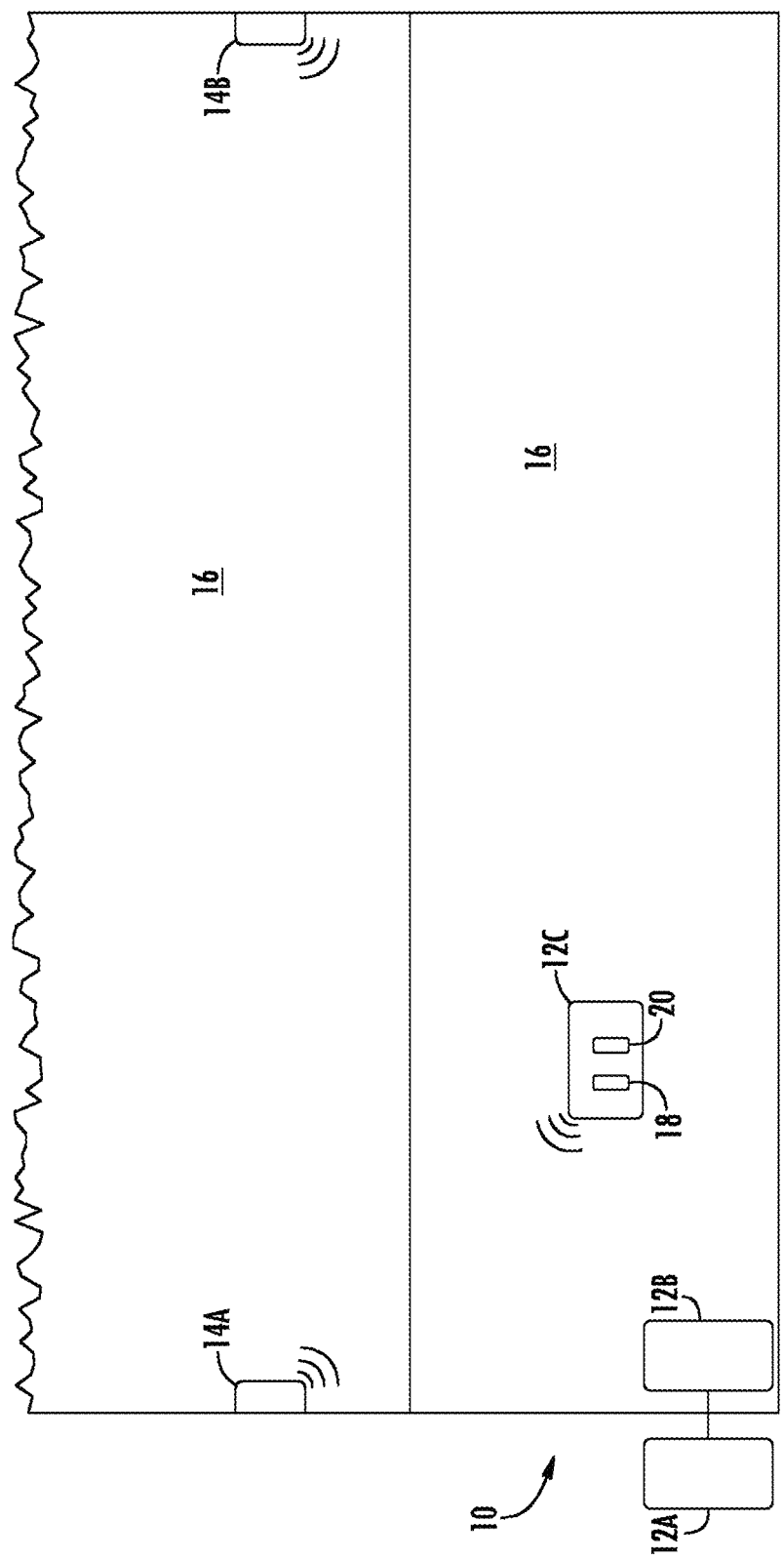
FIG. 1 illustrates a schematic diagram of an HVAC system according to one embodiment of the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 schematically illustrates an embodiment of a system, the system generally indicated at 10. The system 10 is configured to coordinate and operate devices to control the environment within an interior space. The system 10 may be an HVAC system, security system, home automation system, etc. to name a few non-limiting examples. In the embodiment shown in FIG. 1, system 10 comprises an HVAC system. The HVAC system 10 includes an HVAC unit 12 in communication with a detachable faceplate 14A-B.

In the embodiment shown, the HVAC system 10 includes an outdoor HVAC unit 12A, an indoor HVAC unit 12B, and a system controller 12C operably coupled to one another. The outdoor HVAC unit 12A may be an air conditioner or a heat pump to name a couple of non-limiting examples. The indoor HVAC unit 12B may be a furnace, air handler, or boiler, to name a few non-limiting examples. The system controller 12C may be a thermostat to name one non-limiting example. The outdoor HVAC unit 12, indoor HVAC unit 12B, and system controller 12C work in concert to condition the interior space 16. It will be appreciated that the HVAC unit 12 may be any appliance used to condition an interior space 16, such as a geothermal heat pump, chiller, packaged unit, humidifier, and dehumidifier to name a few non-limiting examples.

In an embodiment, the HVAC unit, in this instance the system controller 12C, includes a unit communication device 18 configured to wirelessly transmit and/or receive environmental data regarding the condition of the interior space 16. The HVAC unit 12C further includes a unit controller 20 operably coupled to the unit communication device 18. The unit controller 20 is configured to control operation of the HVAC unit 12A-C, based on the environmental data. It will be appreciated that the unit communication device 18 may be a separate module or integrated into the controller 20. It will be further appreciated that any or all of the outdoor HVAC unit 12A, indoor HVAC unit 12B, and system controller 12C may contain a unit communication device 18 and controller 20.

Figure 2:
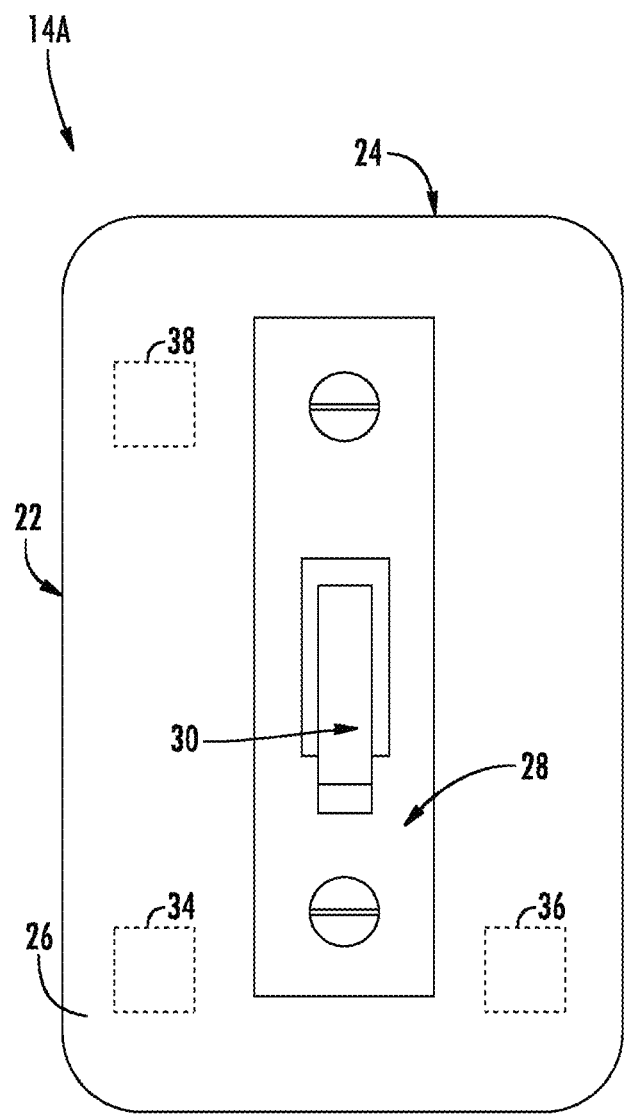
FIG. 2. illustrates a perspective view of a detachable faceplate according to one embodiment of the present disclosure.
Figure 3:
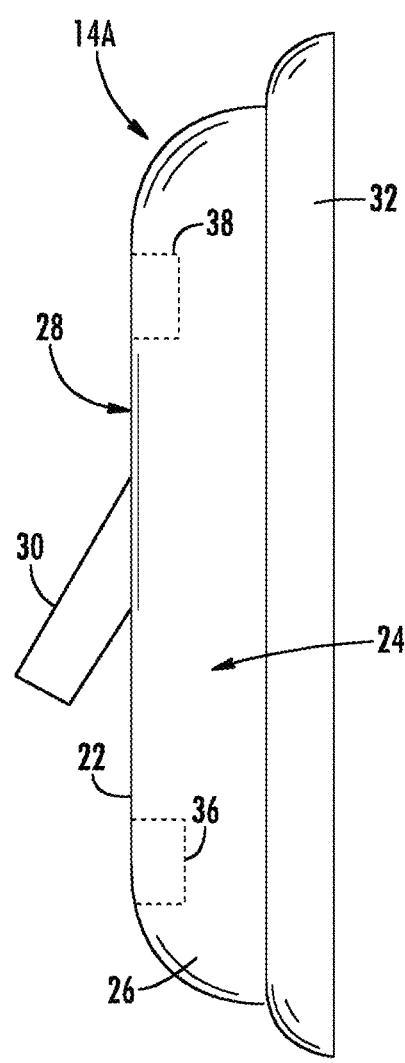
FIG. 3 illustrates a side view of a detachable faceplate according to one embodiment of the present disclosure.

As shown in FIG. 2, each detachable faceplate 14A/B includes a casing 22 including an interior surface 24 and an exterior surface 26. In an embodiment, an aperture 28 is disposed through the casing 22 such that an electrical switching device 30 (e.g. a wall mounted light switch) may be disposed therein. It will be appreciated that the aperture 28 may be configured to accommodate any configuration and number of electrical switching devices 30, including but not limited to toggle switches and a rocker switches. It will further be appreciated that each detachable faceplate 14A/B may be installed in addition to or in lieu of a switch plate cover 32 (as shown in FIG. 3).

Each detachable faceplate 14A/B further includes an environmental sensing device 34 operably disposed within the casing 22. In the embodiment shown, the environmental sensing device 34 is disposed on the interior surface 24 of the casing 22, and is configured to acquire data within the interior space 16 in which it is placed. In an embodiment, the data include environmental data. In an embodiment, the environmental sensing device 34 includes at least one of a temperature sensing device configured to acquire ambient temperature data, a humidity sensing device configured to acquire relative humidity data, a proximity sensing device, a motion sensing device, a sound sensing device, and a light sensing device. For example, the environmental sensing device 34 may be configured to measure the ambient temperature surrounding the respective detachable faceplate 14A/B. It will be appreciated that the proximity sensing device, motion sensing device, and light sensing device may be configured to detect the presence of a person within the vicinity of the detachable faceplate 14. In other embodiments, other types of environmental sensing devices 34 may be used.

Each detachable faceplate 14A further includes a faceplate communication device 36 disposed within the casing 22, and operably coupled to the environmental sensing device 34. The faceplate communication device 36 is configured to transmit the data acquired by the environmental sensing device 34. In an embodiment, the faceplate communication device 36 is in wireless communication with unit communication device 18 to transmit and/or receive the environmental data therebetween. For example, the communication device 36 may transmit and/or receive the environmental data from to a unit communication device 18 within a thermostat, HVAC component, security panel, or home automation panel to name a few non-limiting examples. In some embodiments, the environmental sensing device 34 and the faceplate communication device may be one integral device.

In an embodiment, each detachable faceplate 14A/B includes a power source 38 operably coupled to the environmental sensing device 34 and the faceplate communication device 36. In one embodiment, the power source 38 includes a battery. In another embodiment, the power source 38 includes a power module. In this embodiment, the power module may further be configured to connect to or interface with the electrical switching device power (e.g., the 120V power through the wall, inductive charging, conductive charging, and wireless power transfer to name a few of non-limiting examples).

In operation, each detachable faceplate 14A-B may be attached to any wall mounted electrical switching device (e.g., room light switch) using the mounting devices (e.g., screws) for the existing faceplate. The environmental sensing device 34, disposed therein, measures the ambient air temperature and/or relative humidity of the ambient air within the interior space 16 in which it is placed in one embodiment. The measured ambient air temperature and/or relative humidity is transmitted from the detachable faceplate 14A-B to the unit communication device 18, wherein the controller 20 will operate in the appropriate conditioning mode based on the measured ambient air temperature and/or relative humidity. For example, if the measured ambient air temperature is greater than the desired temperature where the detachable faceplate 14A-B is placed, the controller 20 may operate the HVAC units 12A-C in a cooling mode. In another embodiment, the environmental sensing device 34 detects whether the room in which the detachable faceplate 14A-B is located is occupied. The controller 20 may operate the HVAC units 12A-C in different modes depending on whether the room is occupied or not.

It will therefore be appreciated that the present disclosure provides a detachable faceplate 14A-B containing an environmental sensing device 34 and a faceplate communication device 36 to acquire and wirelessly transmit environmental data for controlling the HVAC system 10, without the need for additional mounting considerations, and still providing access to a wall mounted switching device.

While the disclosure has been illustrated and described in detail in the drawings and foregoing description, the same is to be considered as illustrative and not restrictive in character, it being understood that only certain embodiments have been shown and described and that all changes and modifications that come within the spirit of the disclosure are desired to be protected.

What is claimed is:

1. A system comprising:
   a detachable faceplate comprising:
     a casing including an interior surface and an exterior surface; and an environmental sensing device disposed within the casing, the environmental sensing device configured to acquire data;

wherein the detachable faceplate further comprises an aperture disposed through the casing, the aperture configured to provide passage of an electrical switching device, the electrical switching device accessible through the aperture;

wherein the detachable faceplate further comprises a faceplate communication device disposed within the casing and operably coupled to the environmental sensing device, wherein the faceplate communication device is configured to transmit the data;

wherein the environmental data comprises at least one of an ambient temperature and a relative humidity.

2. The system of claim 1 further comprising a unit in communication with the detachable faceplate.

3. The system of claim 2, wherein the unit comprises a unit communication device in communication with the faceplate communication device, wherein the unit communication device is configured to transmit and/or receive the environmental data.

4. The system of claim 3, wherein the unit further comprises a unit controller operably coupled to the unit communication device, wherein the unit controller is configured to operate the unit based in part on the environmental data.

5. The system of claim 1, wherein the data comprises environmental data.

6. The system of claim 1, wherein the detachable faceplate further comprises a power source operably coupled to the environmental sensing device and the faceplate communication device.

7. The system of claim 6, wherein the power source comprises a battery.

8. The system of claim 6, wherein the power source comprises a power module.

9. The system of claim 1, wherein the environmental sensing device comprises at least one of a temperature sensing device, a humidity sensing device, a proximity sensing device, a motion sensing device, a sound sensing device, and a light sensing device.

10. A system comprising:
a detachable faceplate comprising:
a casing including an interior surface and an exterior surface; and
an environmental sensing device disposed within the casing, the environmental sensing device configured to acquire data;
wherein the detachable faceplate further comprises an aperture disposed through the casing, the aperture configured to provide passage of an electrical switching device, the electrical switching device accessible through the aperture;
wherein the detachable faceplate further comprises a faceplate communication device disposed within the casing and operably coupled to the environmental sensing device, wherein the faceplate communication device is configured to transmit the data;
wherein the faceplate communication device is in wireless communication with the unit communication device.

11. A detachable faceplate comprising:
a casing including an interior surface and an exterior surface; and
an environmental sensing device disposed within the casing, the environmental sensing device configured to acquire data;
wherein the detachable faceplate further comprises an aperture disposed through the casing, the aperture configured to provide passage of an electrical switching device, the electrical switching device accessible through the aperture;
wherein the data comprises environmental data;
wherein the environmental data comprises at least one of an ambient temperature and a relative humidity.

12. The detachable faceplate of claim 11, further comprising a faceplate communication device disposed within the casing and operably coupled to the environmental sensing device, wherein the faceplate communication device is configured to transmit the data.

13. The detachable faceplate of claim 11, wherein the data comprises environmental data.

14. The detachable faceplate of claim 11, further comprising a power source operably coupled to the environmental sensing device and the faceplate communication device.

15. The detachable faceplate of claim 14, wherein the power source comprises a battery.

16. The detachable faceplate of claim 14, wherein the power source comprises a power module.

17. The detachable faceplate of claim 11, wherein the environmental sensing device comprises at least one of a temperature sensing device, a humidity sensing device, a proximity sensing device, a motion sensing device, a sound sensing device, and a light sensing device.

18. A detachable faceplate comprising:
a casing including an interior surface and an exterior surface; and
an environmental sensing device disposed within the casing, the environmental sensing device configured to acquire data;
wherein the detachable faceplate further comprises an aperture disposed through the casing, the aperture configured to provide passage of an electrical switching device, the electrical switching device accessible through the aperture;
a faceplate communication device disposed within the casing and operably coupled to the environmental sensing device, wherein the faceplate communication device is configured to transmit the data;
wherein the faceplate communication device is in wireless communication with the unit communication device.

* * * * *